(12) United States Patent
Murata et al.

(10) Patent No.: US 6,314,464 B1
(45) Date of Patent: *Nov. 6, 2001

(54) COMMUNICATION CONTROL METHOD (75) Inventors: Seiji Murata; Atsushi Shionozaki, both of Tokyo (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/829,212

(22) Filed: Mar. 31, 1997

(30) Foreign Application Priority Data

Apr. 3, 1996 (JP) ................................ 8-081243

(51) Int. Cl.[7] ................................ H04L 12/28
(52) U.S. Cl. ................ 709/226; 709/225; 709/227; 370/216; 370/241; 370/401; 370/408; 370/431; 380/49
(58) Field of Search ................ 709/225–227, 709/200.01, 200; 370/216, 408, 241, 351, 401, 431; 380/49

(56) References Cited

U.S. PATENT DOCUMENTS

| | | | |
|---|---|---|---|
| 5,467,343 | * 11/1995 | Lee et al. | 370/351 |
| 5,517,494 | * 5/1996 | Green | 370/408 |
| 5,719,942 | * 2/1998 | Alred et al. | 380/49 |
| 5,742,772 | 4/1998 | Sreenan | 395/200.56 |
| 5,745,694 | * 4/1998 | Egawa et al. | 395/200.55 |
| 5,748,892 | 5/1998 | Richardson | 395/200.3 |

OTHER PUBLICATIONS

U.S. application No. 08/804,030, dated Feb. 19, 1997.

* cited by examiner

Primary Examiner—Dung C. Dinh
Assistant Examiner—Hien C. Le
(74) Attorney, Agent, or Firm—Bell, Boyd & Lloyd LLC (57) ABSTRACT

Route control and resource reservation mechanisms are integrated so as to perform multicast communication efficiently. In response to a connection establishment request from a new receiver (host F) with a sender (host A), resources are temporarily reserved and a route suitable for the receiver initiated request is selected, and the connection establishment request is transferred to an upper node. A similar process is performed in host D, and a connection establishment request is transferred to an upper node. In host C, resources are reserved, a confirmation request is transferred to a lower node, and the confirmation request is transferred to the host F via host D. In host F, the quantity of resources is adjusted, and the establishment of the connection with host A is completed.

6 Claims, 8 Drawing Sheets

FIG. 1

| Interface Name | ARGUMENT | RETURN VALUE | OPERATION |
|---|---|---|---|
| RouteAdd | PATH (A, B) PATH (B, C) | PATH (A, C) | CALCULATES QUANTITY OF RESOURCES OF PATH (A, C) |
| RouteSelect | PATH LIST | PATH LIST | SELECTS NECESSARY PATH |
| RouteEval | PATH | EVALUATION RESULT | ASSIGNS WEIGHT TO PATH |
| RouteReq | SENDER | PATH LIST | OBTAINS CANDIDATE OF UPPER MODE |

| PRIORITY LEVEL | DATA TRANSFER RATE | CONTENTS |
|---|---|---|
| 1 | 192 Kbps | SOUND |
| 2 | 512 Kbps | COARSE IMAGE |
| 3 | 1 Mbps | FINE IMAGE |

|  | in same segment | through one gateway |
|---|---|---|
| Join as receiver | 22.4 msec | 31.4 msec |
| Join as sender | 23.4 msec | 40.4 msec |

|  | ST-II | RSVP |
|---|---|---|
| ROUTE SELECTION | FROM SENDER | FROM SENDER |
| CONNECTION ESTABLISHMENT | FROM SENDER | FROM RECEIVER |
| COMMUNICATION PATH | STATIC | DYNAMIC |
| SCALABILITY | × | ○ |
| GUARANTEE OF EXISTING CONNECTION | ○ | × |
| REQUEST FROM EACH RECEIVER | × | △ |

COMMUNICATION CONTROL METHOD

BACKGROUND OF THE INVENTION

1. Field of the Invention

The present invention relates to a communication control method and, more particularly, to a communication control method suitable for use in, for example, multicast communication.

2. Description of the Related Art

Recently, in distributed processing environments in which computers are interconnected over a network, multimedia applications, such as electronic teleconferencing and video on demand systems, have attracted attention. Characteristics of communications performed by such multimedia applications are that there is a real-time limitation upon data transfer, for example, data must be transmitted at a fixed rate or within a fixed time, and the same data must be efficiently transferred to a plurality of receivers at the same time.

Several protocols for reserving resources corresponding to multicast have already been proposed. Here, the resources are CPU (Central Processing Unit) processing time, a network band, a data buffer and the like. For example, ST-II (Internet Stream Protocol, Version 2) is a protocol for establishing a one-to-multiple connection. A sender proposes an optimum FlowSpec (Flow Specification) and multicasts a connection establishment request to all the receivers. Here, FlowSpec indicates data transfer properties, such as data transfer rate or permissible transmission delay, and the quantity of resources required for data transfer is calculated on the basis of a specified FlowSpec.

Each receiver sends back to the sender a maximum FlowSpec which can be ensured over the route to the sender. The sender selects a minimum-level FlowSpec from among the FlowSpecs gathered from all the receivers and transmits a connection establishment request again. In the second connection establishment request, resources are actually reserved, and an identical FlowSpec connection is established for all the receivers. This connection establishment procedure is performed each time a receiver joins or leaves.

Further, in RSVP (Resource ReSerVation Protocol), by periodically sending a tree construction request in advance using conventional multicast, a multicast tree managed by RSVP is constructed. A newly joining receiver establishes a connection with the sender by sending a connection establishment request by backtracking the constructed tree. In this method, since connection establishment is performed for each receiver, it is possible to set a different FlowSpec to each receiver. In RSVP, the established connection is reestablished dynamically rather than statically in accordance with a tree construction request which is periodically received.

However, in a conventional network protocol, since time required for data transfer varies according to the quantity of resources which can be used during data transfer, it is difficult to satisfy the real-time characteristic of data transfer. Therefore, a protocol is required by which a connection is established between the sender and the receiver, and necessary resources are reserved beforehand in accordance with a transfer request before starting transmission.

In particular, in multicast communication (one-to-multiple communication), a plurality of receivers are involved, and the connection dynamically varies during data transfer as receivers join or leave. For this reason, there is a demand for a real-time multicast protocol by which a path is shared and a connection can be established dynamically in response to a request from a receiver by setting up a connection between the sender and the receiver on a tree.

Figure 11:
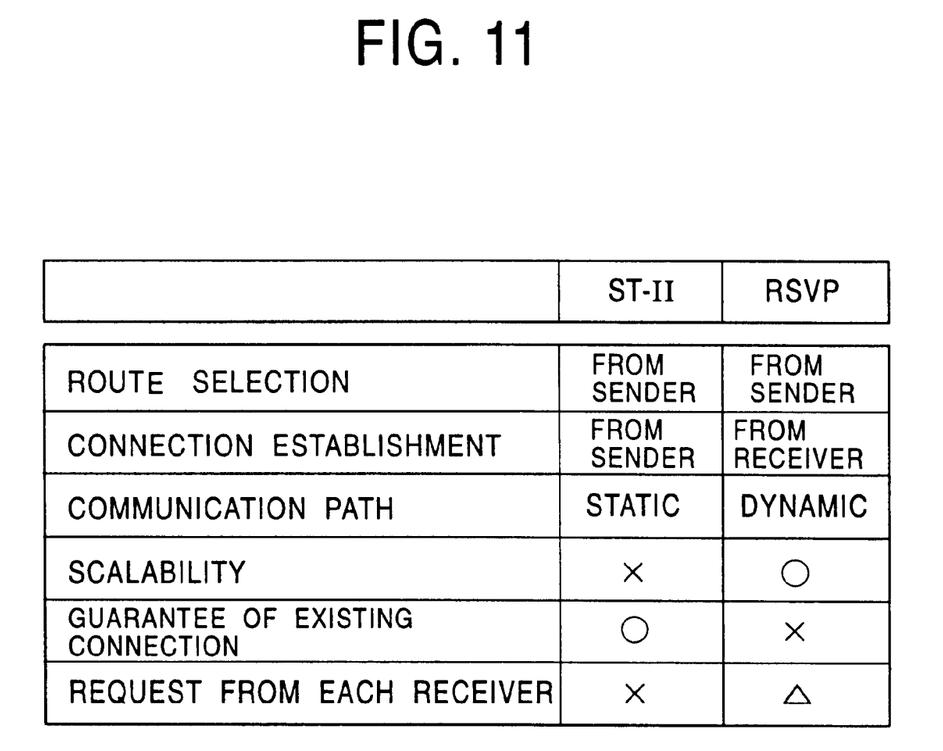
FIG. 11 shows features of conventional protocols ST-II and RSVP.

The summarized features of the above-described two protocols ST-II and RSVP are shown in FIG. 11. As shown in FIG. 11, in ST-II, since a resource reservation is repeated from a sender each time a receiver joins, the load of the connection establishment request when the receiver joins concentrates on the sender, and scalability of the number of members in the group is a problem. Further, transfer level of each receiver is adjusted to the lowest transfer level among the receivers.

Therefore, in RSVP, by. transmitting a connection establishment request from a receiver, the above-described problems are solved. However, since the route varies dynamically, ensurance of an established connection is not sufficient. Further, although handling of requests from each receiver is attempted, it is not possible to select an optimum route appropriate for the request from each receiver because the route selection itself is made by the sender.

As described above, the problems of the conventional protocol are thought to occur from the fact that route selection can be made only by the sender because the route control and resource reservation mechanisms are considered to be completely independent. However, in the existing multicast route control algorithm, in an internal process, it is possible to select a route to the sender from the receiver.

SUMMARY OF THE INVENTION

The present invention has been achieved in view of the above-described circumstances. The present invention aims to make it possible to effect route control and to establish a connection in accordance with a request from each receiver by determining an interface between a route control mechanism and a resource reservation mechanism and integrating the mechanisms.

To these ends, according to a first aspect of the present invention, there is provided a communication control method for establishing a connection between a plurality of senders and a plurality of receivers over a network and controlling communications between the senders and the receivers, the method comprising the steps of: selecting a route between the senders and the receivers on the basis of a request from the receiver; defining an interface between the route selection mechanism for establishing a connection and the resource reservation mechanism for reserving the resources of the route; and integrating the route selection mechanism and the resource reservation mechanism.

According to a second aspect of the present invention, there is provided a communication control method for establishing a connection between a plurality of senders and a plurality of receivers over a network and controlling data transfer from the sender to the receiver, the method comprising the steps of: establishing a connection from a receiver to each sender on the basis of a sender list held by each sender; when the plurality of senders share the connection, limiting the number of the senders who transmit data via the connection at the same time to below a predetermined number on the basis of the quantity of the resources reserved for the connection; and accepting a request for joining the network from a new sender or receiver when a QOS (Quality of Service) request of the sender and the receiver between which there has been an established connection is ensured even when the new sender or receiver joins the network.

According to a third aspect of the present invention, there is provided a communication control method for establishing a connection between a plurality of senders and a plurality of receivers over a network and controlling communications between the senders and the receivers, the method comprising: a step for making a connection establishment request to a first upper node from a new receiver; a step for temporarily reserving resources on the basis of the connection establishment request; a step for selecting a route suitable for the connection establishment request from the receiver; a step for confirming the establishment of a connection between the first upper node and a higher upper node and reserving the resources when it is confirmed that the request of the receiver is satisfied; and a step for establishing a connection to a lower node from said second node when the resources are reserved.

According to a fourth aspect of the present invention, there is provided a communication control method for establishing a connection between a plurality of senders and a plurality of receivers over a network and controlling communications between the senders and the receivers, the method comprising: a step for determining, when a failure occurs, whether a connection failure with the neighboring nodes has occurred; a step for determining whether a connection has been established between the nodes between which communication becomes impossible and abandoning the connection when there is an existing connection; a step for searching for another route when it is determined that communication with an upper node is not possible; a step for freeing the resources of the upper node and sending a connection reestablishment request to a lower node when there is no other route; and a step in which the node which has made the connection reestablishment request abandons the current connection, and then searches for another route and attempts to reestablish a connection.

In the communication control method in accordance with the first aspect of the present invention, a route between a sender and a receiver is selected on the basis of a request from the receiver, an interface between a route selection mechanism for establishing a connection and a resource reservation mechanism for reserving resources of the route is defined, and the route selection mechanism and the resource reservation mechanism are integrated.

In the communication control method in accordance with the second aspect of the present invention, a connection is established from a receiver to each sender on the basis of a list of senders held by each sender. In a case where a plurality of senders share the connection, the number of senders who transmit data to the receivers at the same time via the connection is limited to below a predetermined number on the basis of the quantity of the resources reserved for the connection. A request to join the network from a new sender or receiver is accepted when a QOS request of the sender and the receiver between which there has been an established connection is ensured even when the new sender or receiver joins the network.

In the communication control method in accordance with the third aspect of the present invention, a connection establishment request is made from a new receiver to a first upper node. On the basis of the request, resources are temporarily reserved. A route suitable for the connection establishment request from the receiver is selected. Establishment of a connection between the first upper node and a second node higher than the first upper node is confirmed. When it is confirmed that the request from the receiver is satisfied, resources are reserved. When the resources are reserved, a connection to a lower node is established from the second node.

In the communication control method in accordance with the fourth aspect of the present invention, a check is made to determine if a failure of connection with neighboring nodes has occurred. When a failure has occurred, a check is made to determine if a connection has been established with the node with which communication becomes impossible. If a connection has been established, the connection is abandoned. When it is determined that communication with an upper node is impossible, another route is searched for. When there is no other route, the resources of the upper node are freed, and a connection reestablishment request is sent to a lower node. The node which made the connection reestablishment request abandons the current connection, and then searches for another route and attempts to reestablish a connection.

The above and further objects, aspects and novel features of the invention will become more apparent from the following detailed description when read in connection with the accompanying drawings.

DESCRIPTION OF THE PREFERRED EMBODIMENTS

The details of a real-time multicast protocol RtMP of the present invention will be described below in detail.

In order to maintain general-purpose characteristics, when route control and resource reservation are integrated, dependence upon a specific route control algorithm is not desirable. For this reason, the mechanism relating to route control is divided into a portion which is dependent upon the route control algorithm and a portion which is independent of the route control algorithm.

For example, the portion which depends upon the route control algorithm exchanges routing information between the nodes and performs routing calculation, and the portion which is independent of the route control algorithm manages and evaluates the resources specified in the routing information, selects a predetermined route from a proposed route, and holds information relating to existing connections.

Figure 1:
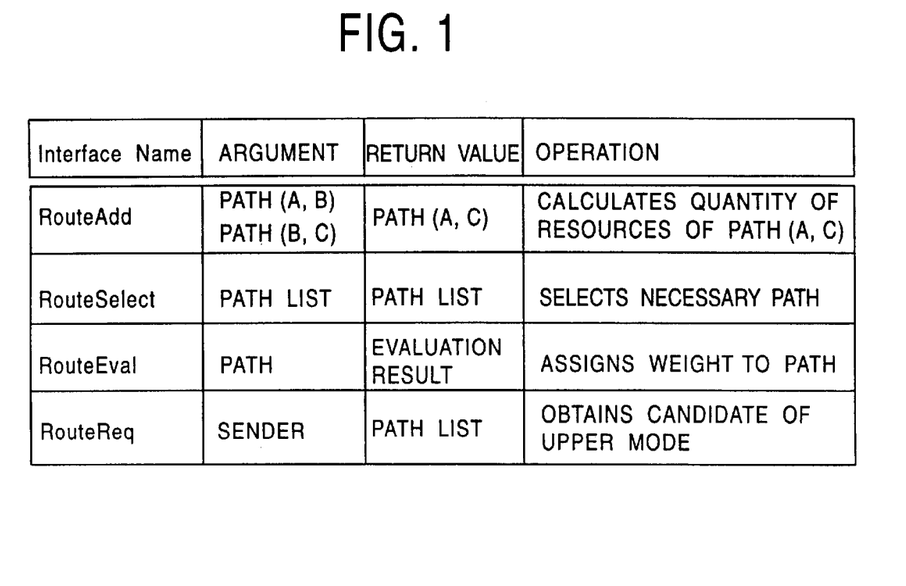
FIG. 1 shows an example of an interface between a route control section and a resource reservation mechanism.

In a case where evaluation of the resources is required when a route is selected, using three interfaces (RouteAdd, RouteSelect, and RouteEval) from among the interfaces shown in FIG. 1, the resource reservation module performs the evaluation. When a connection is established, the resource reservation module obtains upper node candidates using an interface RouteReq and selects the upper node most suitable to satisfy the request from the receiver from among the candidates.

With this mechanism, it is possible to reflect parameters relating to the resources upon routing information without being dependent upon a specific route control algorithm, and thus a route appropriate for a request from the receiver can be selected.

In order to cope with various requests from a receiver, it is necessary to be able to establish a connection of FlowSpec which the route satisfies for each route. That is, it is necessary to be able to establish a different FlowSpec connection for each route.

Figure 2:
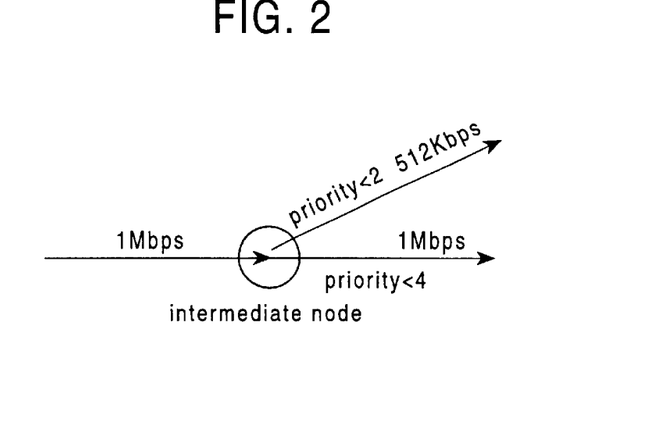
FIG. 2 shows an example of an intermediate node from which a route branch into routes having mutually different transfer capabilities.

More specifically, it is not always possible to transfer data sent out from the sender to all the routes. When the route branches as shown in FIG. 2, it is necessary to confirm the transfer capability of each route and send data to only routes having transfer capability. In such cases, if an amount of data exceeding the transfer capability is transferred, extra resources are used; not only can the real-time characteristic of the connection not be ensured, but also adverse influences might be exerted upon other connections.

Therefore, a priority level is provided to transmission data so that an intermediate node selects a route through which the data is transferred according to that level. Inside RtMP, the priority levels are mapped to the data transfer rates. In the case of the intermediate node shown in FIG. 2, the route branches into a route having a transfer rate of 512 Kbps (kilobytes/sec) and a route having a transfer rate of 1 Mbps (megabytes/sec). Further, data which can be transferred to the route having a transfer rate of 512 Kbps is assumed to be data whose priority level is 2 or less, and data which can be transferred to the route having a transfer rate of 1 Mbps is assumed to be data whose priority level is 3 or less.

Figure 3:
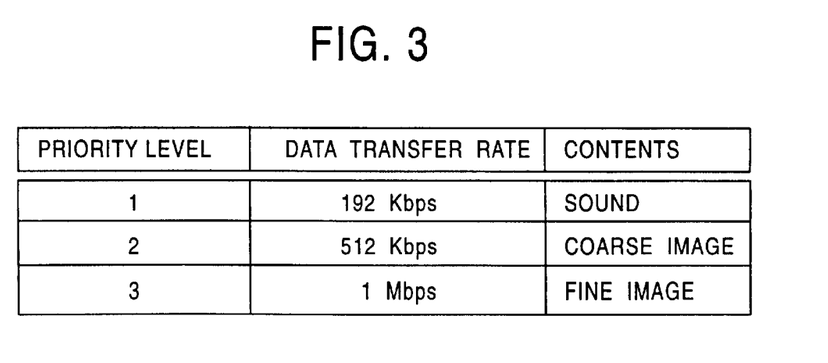
FIG. 3 shows an example of a correspondence relationship between priority levels and data transfer rates.

FIG. 3 shows a correspondence relationship between priority levels and data transfer rates. The correspondence between the priority level and the data transfer rate is specified by the sender. The receiver specifies a priority level to be received as a FlowSpec parameter when making a connection establishment request.

In the transmission node, the data transfer rate is controlled so as to not exceed the data transfer rate specified by the priority level. In each intermediate node and receiving node, data which has been transferred is transferred or received in accordance with the priority level specified at the time of connection establishment.

When this data transfer control mechanism is seen from the sender side, the sender has a multiplexed channel, and is capable of transmitting data according to the priority of each data. Therefore, for example, as shown in FIG. 3, when the priority level is "1", sound is transmitted, when the priority level is "2", a coarse image is transmitted, and when the priority level is "3", a fine image is transmitted. As a result, it becomes possible for a node having many resources to obtain fine images and for a node having few resources to obtain coarse images or only sound.

Apart from the priority levels, information such as arrival time limitation (a limitation such that data should arrive within a fixed time), is present as connection information. This information is managed by an intermediate node in a manner similar to the priority level, and is referenced at data transfer time when a connection is established.

Figure 4:
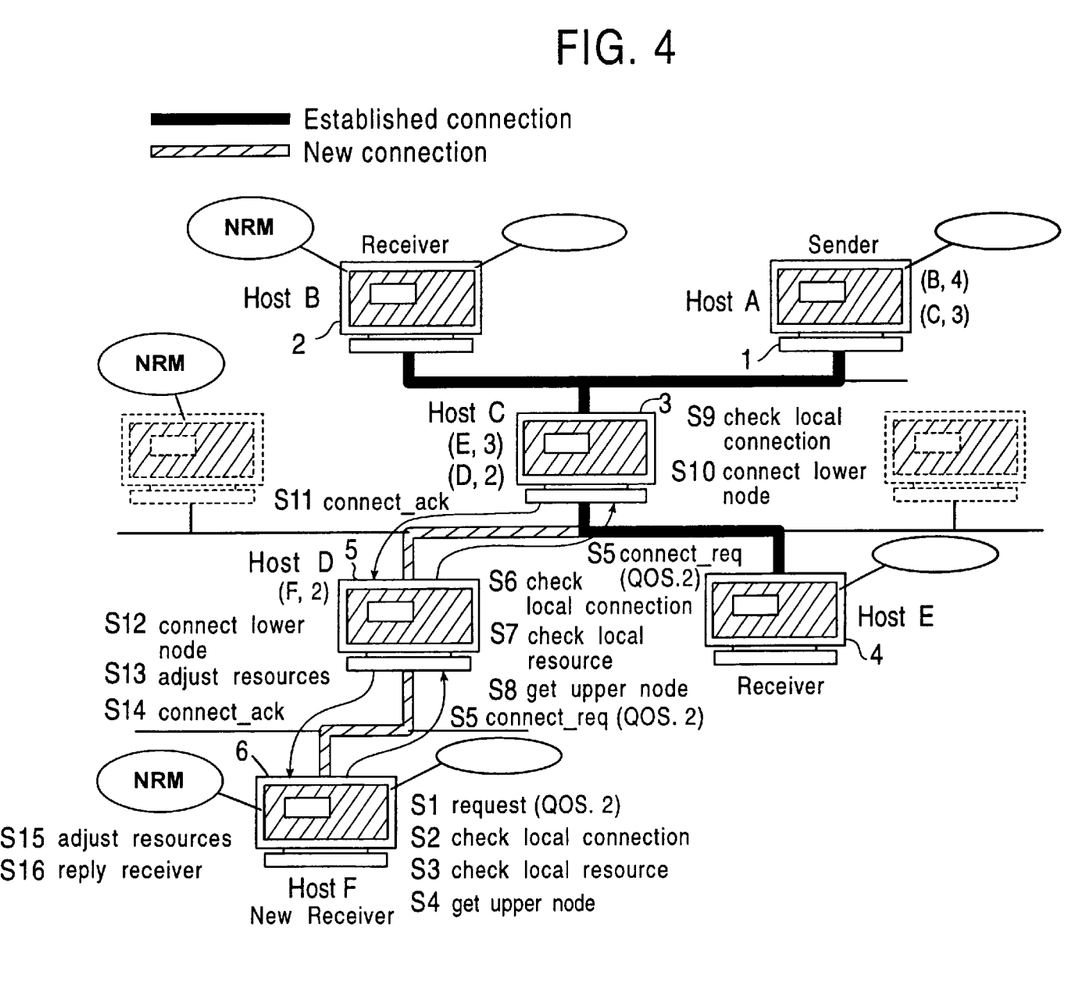
FIG. 4 shows an example of a connection establishment procedure.

FIG. 4 shows an example of a connection establishment procedure. Shown here is a process which is performed when host 6 (=HostF) which is a new receiver joins a connection set up among host 1 (=HostA) which is a sender, and host 2(=HostB) and host 4 (=HostE) which are receivers. In FIG. 4, the arrow indicates the flow of messages, and the information (lower node, priority level) written below the host name indicates connection information.

In steps S1 to S3, a resource reservation module temporarily reserves the resources in accordance with a connection establishment request (request (QOS,2), in this case, transmission of data with QOS (Quality of Service) corresponding to 2 is requested) from the receiver.

In step S4, an inquiry about an upper node is made to the route control module, and a route appropriate for the request from the receiver is selected (get upper node). Next, in step S5, a connection establishment request (connect_req (QOS, 2)) is transferred to an upper node (in this case, host 5 (host D)).

When host D receives the connection establishment request from host F, host D does not have an established connection with an upper node (in this case, host 3 (=host C)) and thus cannot satisfy the request from the receiver. Therefore, a process from steps S6 to S8 corresponding to a process from steps S2 to S4 in host F is performed so that the resources are temporarily reserved, and the connection establishment request is transferred to a higher upper node (step S5 from host D).

Host C receiving this connection establishment request from host D recognizes in step S9 that a connection has already been established with host A. Since, in this case, it is possible to satisfy the request from the receiver (satisfies a predetermined FlowSpec), the resources a reserved. In step S10, a connection with a lower node is established, and in step S11, an acknowledge request (Connect_ack) in addition to connection information is sent back to the lower node.

Meanwhile, when the established connection does not satisfy the request, changing the FlowSpec is attempted. This process of changing the FlowSpec is performed basically in a procedure similar to the resource reservation request process performed in the above-described steps S1 to S3. However, the process of changing the FlowSpec here differs from the above-described resource reservation request process in that this process is performed on a connection which has already been established, and that the current resources are changed rather than reserving new resources.

In a case where a connection with an upper node has not been established or where the above-described FlowSpec change is not possible, a resource reservation request process is repeated in the same manner as in the above-described case.

The node receiving the acknowledge request from the upper node adjusts the quantity of resources which have been temporarily reserved previously, and sends an acknowledge request to the lower node. In this case, host D receiving the acknowledge request from host C establishes a connection with the lower node in step S12. In step S13, the resources which have been temporarily reserved previously are adjusted. In step S14, an acknowledge request is transmitted to the lower node.

In this way, when the acknowledge request from the upper node (in this case, host C) is returned to the node (in this case, host F) of the receiver, in step S15, the quantity of resources is adjusted, and at this point, the connection establishment is completed. Next, in step S16, the connection establishment completion is notified to the receiver (host F).

In this method, since a route is selected in accordance with a request from the receiver, it becomes possible to establish a connection most appropriate for the request. Further, since the connection establishment process is performed on only the node connected to the receiver, scalability of the group is maintained. Furthermore, by confirming the quantity of remaining resources for each node, it is possible to ensure that the established connection is not disturbed.

In RtMP, the established connection does not usually vary as long as receivers do not join or leave. This is because a requirement of a real-time communication protocol is that the established connection always ensures data transfer (the connection is not disturbed due to the operation of the protocol) except when a failure occurs.

However, when a connection is static, changing of a route due to failure of a host or a network is not reflected upon the connection, so it is necessary to explicitly perform a failure recovery process. The process to be performed when a failure occurs is described below.

Figure 5:
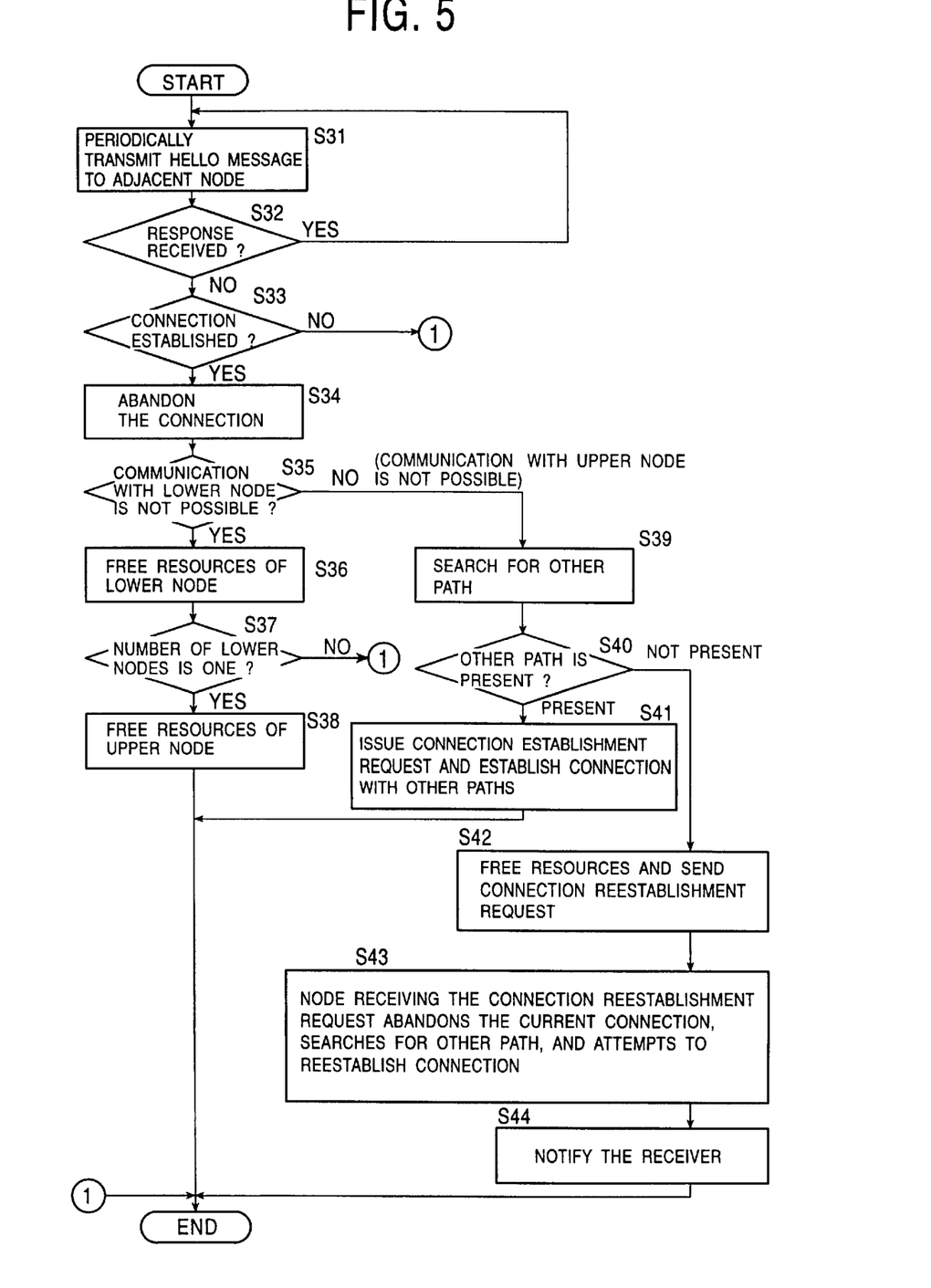
FIG. 5 is a flowchart illustrating an example of a process procedure to be performed when a failure occurs.

FIG. 5 is a flowchart illustrating an example of a process when a failure occurs. Initially, in step S31, the route control section transmits a "HELLO message" periodically to the neighboring nodes. In step S32, a determination is made whether there is a response from the neighboring nodes. When it is determined that there is a response from the neighboring nodes, assuming that no failure has occurred, the process returns to step S31, and the process from step 31 et seq. is performed. When, meanwhile, it is determined that there is no response from the neighboring nodes, assuming that a failure has occurred in the neighboring nodes or in the network with the neighboring nodes, the process proceeds to step S33 where the process to be performed when a failure occurs is started.

In step S33, a determination is made whether a connection had been established with the node with which communication has become impossible. When it is determined that a connection has not been established, the process is terminated. When, meanwhile, it is determined that a connection has been established, the process proceeds to step S34 where the connection is abandoned.

Next, in step S35, a determination is made whether the node with which communication has become impossible is a lower node. When it is determined that the node with which communication has become impossible is a lower node, since it is not necessary to transmit data to a lower node, the process proceeds to step S36 where the resources of the lower node are freed.

Next, in step S37, a determination is made whether the number of lower nodes is only one at this time. When it is determined that the number of lower nodes is only one, a connection abandon request is sent to the upper node, and the resources of the upper node are also freed, terminating the process.

On the other hand, when it is determined in step S35 that communication with the lower node is possible, that is, it is determined that communication with the upper node becomes impossible, the process proceeds to step S39 where another path is searched for.

Next, in step S40, a determination is made whether another path is present. When it is determined that another path is present, the process proceeds to step S41 where a connection establishment request is issued to establish a connection to the other path. When, meanwhile, it is determined that another path is not present, the process proceeds to step S42 where the resources of the upper node are freed, and a connection reestablishment request message is sent to the lower node.

In step S43, the node receiving the connection reestablishment request abandons the current connection, and then searches for some other path in order to try to reestablish a connection. Next, the process proceeds to step S44 where notification is made to the receiver. That is, at the same time when the connection is abandoned, the fact that a failure has occurred is notified to the receivers who are present in the lower nodes. Further, when the reestablishment of the connection has been completed, this fact is notified again to the receivers who are present in the lower nodes. This terminates the process.

With such a process, the receivers are able to know that real-time characteristic cannot be maintained when data is transferred in a case in which a failure has occurred, and are able to take steps therefor. Further, a connection is reestablished as far as possible. These are important functions for dealing with failures.

For example, as in teleconferencing, there are a number of applications which require multiple-to-multiple communication in addition to one-to-multiple communication. In particular, some applications have a feature that data is transmitted to only a fixed number of senders at the same time. In such a case, it is possible to efficiently utilize resources by sharing a connection by taking properties of communication into consideration rather than establishing a connection for each sender.

Mechanisms required to efficiently support a multiple-to-multiple connection are summarized below.

First, a mechanism for sharing a connection is required. In a common-source path, a band corresponding to a maximum number of senders needs to be reserved. However, a protocol is required for ensuring that senders cooperate so no more than a reserved number of senders transmit data at the same time.

For example, by using a protocol described below, it is possible to limit the number of senders who transmit data to receivers at the same time to below a predetermined number.

More specifically, all the senders have a sender list, so the list of senders who can transmit is managed in a similar manner. Since all the senders have a sender list, a token is exchanged between the senders, and the sender to whom the token is passed transmits, when there is data to be transmitted to a receiver, the data to the receiver, and passes the token to the next sender at a predetermined timing. Also, when there is no data to be transmitted, data is not transmitted and the token is transmitted to the next sender at a predetermined timing.

Here, the token can be made to be transmitted to the next sender, for example, according to a priority set for each sender which is written in the sender list. The time for which the token is held by each sender can be determined on the basis of this priority. As a result, it is possible to limit the number of senders who transmit data to the receiver at the same time to one.

By applying the above-described protocol in such a manner as to exchange a predetermined number of two or more tokens between the senders, it is possible to limit the number of senders who can transmit data to the receivers at the same time to below a predetermined number of two or more. Therefore, the use of the above-described mechanism makes it possible to limit the number of senders who can transmit data to the receivers at the same time to below a predetermined number of one or more.

Next, a mechanism for selecting a receiving channel is required. Each receiver does not receive data from all the senders, but receives data only from a specific sender.

At this time, in order for the senders to cooperate or for the receivers to establish a connection with respect to any desired sender, a list of senders becomes necessary. In RtMP, this is handled by newly adding a protocol for managing a sender list. The details of the portions which are added and changed within the RtMP will be described below.

A description will be given first of the management of the sender list. It is easy to determine a representative who manages the sender list and to have the representative to centrally manage the sender list. However, since the updating and holding of the sender list concentrates at one point, if a failure occurs in the manager, a fatal failure occurs in the protocol operation. Further, a problem of concentration in updating load occurs.

Therefore, in RtMP, a method is employed in which the sender list is held by each sender. In order to ensure consistency of the sender list, a method for providing a total sequence relation to updating, which is used in group member list management, is employed in Process Group Management Protocol (PGMP) proposed before by the inventors of the present invention. In a case in which, for example, a plurality of senders update the sender list at the same time, there is a possibility that the sender list might be updated on the basis of an old sender list. To prevent this, a total sequence relation is provided to an updating request so that all the senders receive an updating request in the same sequence and reject an updating request based on an old sender list.

More specifically, when each sender receives an updating request that a predetermined sender (hereinafter referred to as a sender A) transmitted to each sender, a predetermined non-executable mark indicating that the updating request cannot be executed yet is provided correspondingly to the updating request and is placed in an updating request queue. Then, each sender sends back to the sender A an acknowledgement together with the sequential number indicating the sequence in which the updating request is received.

When the sender A receives the acknowledgements and the sequential numbers from all of the senders, the sender A transmits to each sender a second updating request together with the highest sequential number from among the received sequential numbers. Upon receiving the second updating request together with the sequential number from the sender A, each sender updates the sequential number of the first received updating request in the queue to the sequential number which is just received from the sender A, changes the non-executable mark to an executable mark, and sorts the queue in ascending order of the sequential numbers. At this point, in a case in which the same sequential number corresponds to a plurality of updating requests in the queue, these updating requests are sequenced according to a predetermined standard reference, for example, the address or the like of the sender (host).

In a case in which an executable mark is associated with the updating request rearranged to the head by this sort, whether the updating request is based on the current sender list is confirmed by comparing the versions associated with the sender lists. When the confirmation shows that the sender list is the current version, the updating request from the sender A is accepted, each sender updates the sender list held by each sender, increases the version of the sender list by one and transmits an updating completion notification to the sender A.

On the other hand, when the confirmation shows that the updating request is based on an old sender list rather than on the current sender list, each sender rejects the updating request and transmits a reject message to the sender A. When the sender A receives the reject message from each sender, the sender A again makes an updating request to each sender, and the above-described process is repeated. With such a mechanism, it is possible for each sender to hold a list of senders who currently have the possibility of transmitting data to the group.

In a case in which a new sender joins, it is necessary to establish a connection with each receiver. In RtMP, since a normal connection establishment is performed from the receiver when the receiver joins, a special connection establishment procedure is required. A sender joining procedure in RtMP will be described below with reference to the flowchart shown in FIG. 6.

Figure 6:
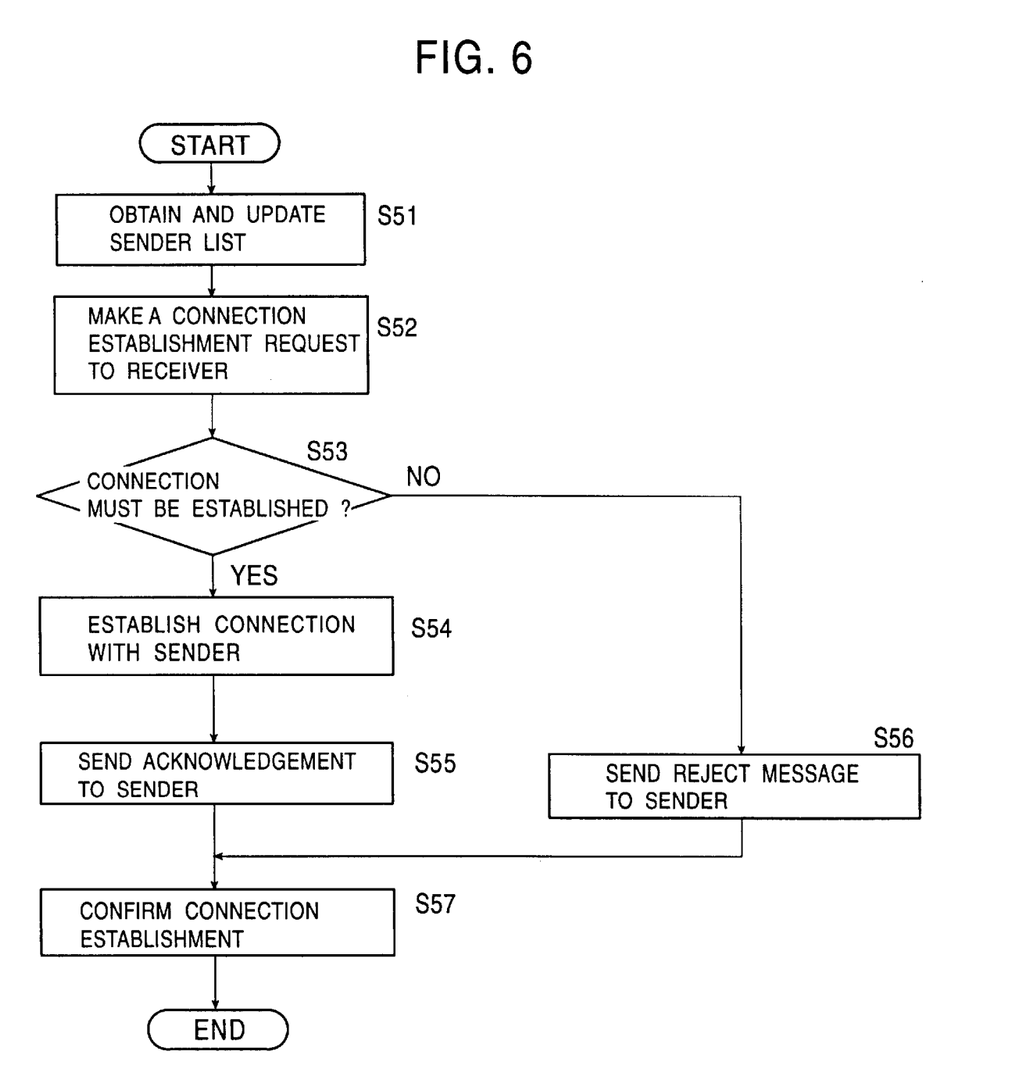
FIG. 6 is a flowchart illustrating an example of a connection establishment procedure when a sender joins.

Initially, in step S51, the sender list is obtained and updated. That is, the sender list is obtained from another sender, and its self host is added to the list that the other sender holds.

Next, the process proceeds to step S52 where a connection establishment request is made to the receiver. For this connection establishment request to the receiver, since a connection has not yet been established to the receiver, a normal multicast provided by the route control section is used. Lower nodes which transferred this request are registered in each intermediate node so as to prepare the summation of acknowledgements.

Next, in step S53, a determination is made whether a connection must be established. That is, in a case in which the receiver receiving this request desires to receive from all the senders, assuming that a connection with a new sender must be established, the process proceeds to step S54.

In step S54, the receiver establishes a connection with the new sender. The establishment of the connection here is performed in a manner similar to the normal connection establishment by taking into consideration the request from the receiver unlike ST-II (Internet Stream Protocol, Version 2) where connection is performed along the tree formed by a request message from the sender.

Next, the process proceeds to step S55 where when the connection establishment is completed, an acknowledgment of the connection establishment completion is transmitted to the sender.

When, meanwhile, it is determined in step S53 that the connection establishment is not required, that is, the receiver rejects the connection establishment with the sender, the process proceeds to step S56 where a reject message is sent back to the sender.

The acknowledgment in step S55 and the reject message in step S56 are sent to the sender along the tree constructed when the connection establishment request from the sender is transferred to the receiver.

Next, in step S57, the connection establishment is confirmed. That is, the sender waits for the arrival of acknowledgments or reject messages from all the lower nodes. When the acknowledgments or the reject messages from all the lower nodes have been received, the sender joining procedure is terminated.

At this point, when a reject message has been received, the sender is not allowed to join the group. In this case, a process for cancelling the sender joining procedure which has already been initiated is performed.

With this mechanism, when a sender newly joins, a connection is established automatically with respect to the existing receivers, and thus it becomes possible for the receiver to receive data from the new sender.

Figure 7:
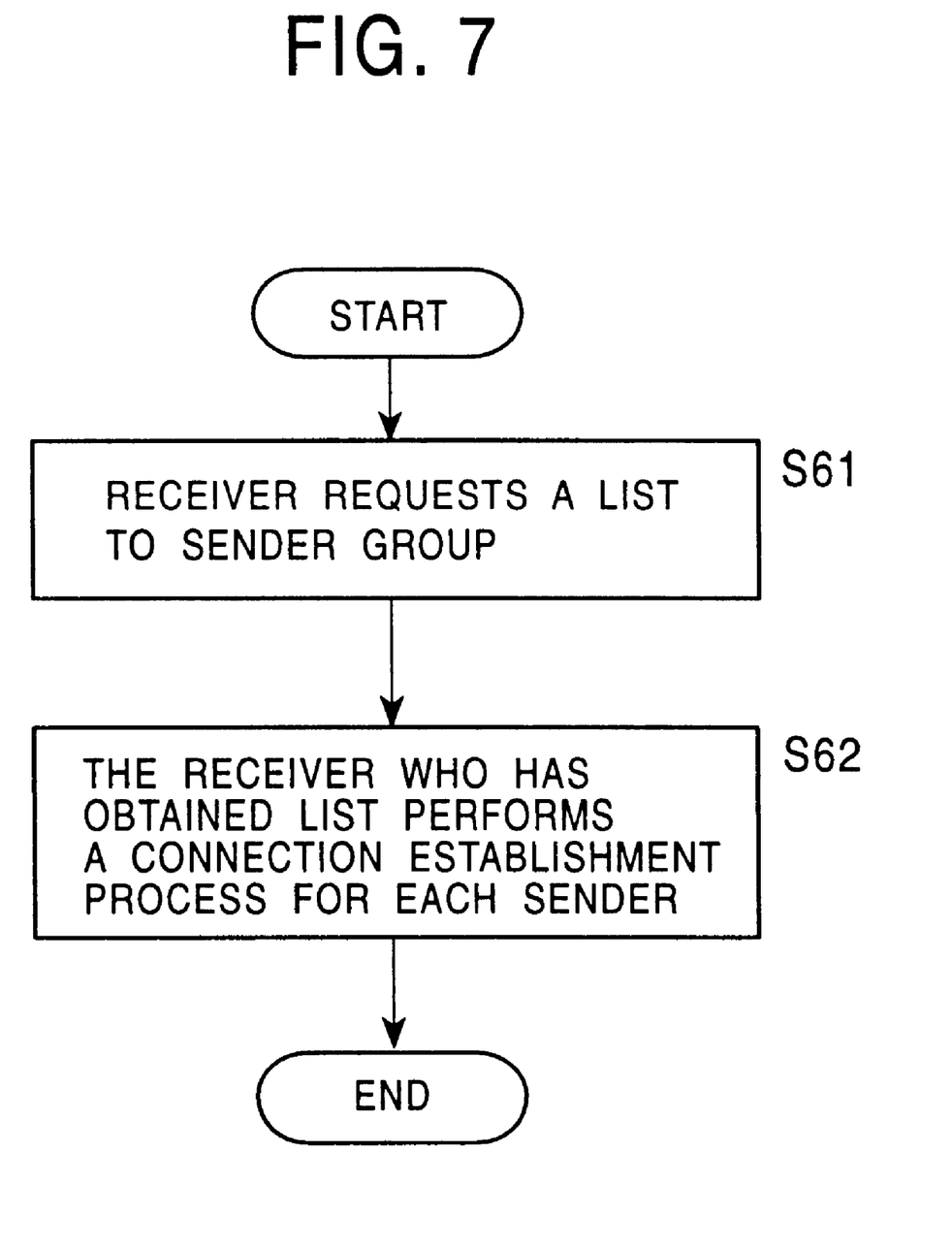
FIG. 7 is a flowchart illustrating an example of a connection establishment procedure when a receiver joins.

Next, a process in a case in which a receiver joins will be described with reference to the flowchart shown in FIG. 7. A difference from the one-to-multiple case is that since there is a possibility that there are a plurality of senders, it is necessary to establish a connection with each sender. In such a case, the connection properties, such as the possibility of the sharing of the connection, must be taken into consideration.

Initially, in step S61, the receiver requests a list to the sender group. Next, in step S62, the receiver obtaining the list performs a connection establishment process for each sender. In such a case, when it is possible to share a connection which has already been established, reservation of further resources is not performed even with a different sender. However, the connection establishment request is sent to an upper node. This is because with a different sender, the existing connection is not always established up to the target sender.

Also, when the receiver leaves, the connection is not abandoned simply as in the one-to-multiple communication, and a determination is made whether or not the connection has been shared. When the connection has been shared, it is not released. In a similar manner as in the case of a connection establishment, the abandon request itself is transferred to an upper node.

The joining request of a new sender or receiver is accepted under the condition that the QOS of the senders and the receivers who have established an existing connection is always ensured.

Next, implementation of RtMP will be described. RtMP is implemented in an RTS/NPS (Real-Time Server/Network Protocol Server) which runs on an RT-Mach (Real-Time Mach) which is a real-time operating system. Here, RtMP is implemented as one protocol within NPS, and servers for effecting route control in cooperation at the same time and servers for managing the network resources of each network segment are also implemented.

Figure 8:
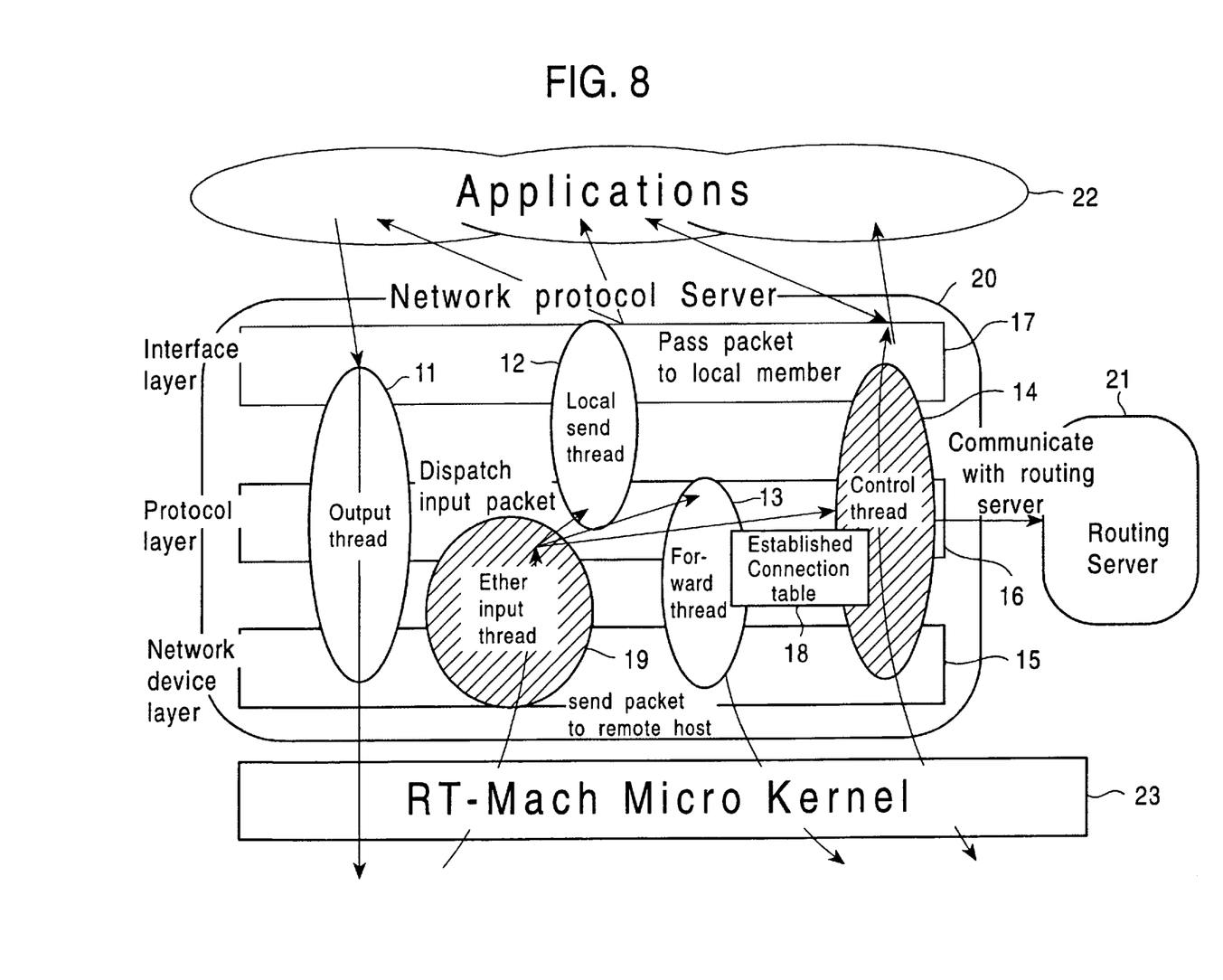
FIG. 8 shows an example of an internal construction of RtMP.

FIG. 8 shows an example of an internal construction of RtMP. RtMP, as described above, is implemented as one protocol within a network protocol server 20 which runs under an RT-Mach Micro Kernel 123 which is a real-time operating system. The network protocol server 20 comprises a network device layer 15, a protocol layer 16, and an interface layer 17. The network protocol server 20 and a routing server 21 for controlling route exchange information via a control thread 14 which performs predetermined interfacing and the like.

The real-time characteristic of data transfer is ensured by allocating cyclic real-time threads (output thread, local send thread and forwarder thread) for performing input/output processes and a dedicated buffer for each established connection. Since a real-time characteristic need not be ensured for a control message, such as a connection establishment request, the control message is processed by the NPS general-purpose control thread 14.

Next, how each message is processed will be described. A packet received by a network device driver of the network device layer 15 is processed first by a high-priority input thread (In FIG. 8, Ether input thread 19) assigned to a data link protocol of a protocol layer 16. Here, in accordance with a "protocol type" of the Ether packet header, an input process routine (RtMP input process routine) of an upper protocol is called.

Next, the RtMP input process routine determines whether the data is user data or a control message on the basis of the contents of a "type field" of the RtMP packet header, and the data is dispatched to an appropriate thread.

When it is determined that the data is user data, a connection table (RtMP PORT) 18 is searched on the basis of a destination group address. In accordance with the routing information section of the RtMP_PORT 18, the data is passed to a thread (in FIG. 8, a local send thread 12) for transfer to receivers who are present locally and a thread (in FIG. 8, a forwarder thread 13) for transfer to lower nodes. The local send thread 12 controls a process for placing data in a receiving buffer of each receiver, and the forwarder thread 13 transfers data to lower nodes shown in the RtMP_PORT 18.

On the other hand, when it is determined that the data is a control message, the RtMP_PORT 18 is searched on the basis of the destination group address. Processes are performed in accordance with the state of the connection and each message type, and the data is transferred to the routing server 21, a network resource manager (not shown), and other nodes as required.

As described above, by separating the thread into a thread for protocol control and a thread for data transfer and by assigning a dedicated buffer, it is possible to prevent data transfer from being obstructed by other processes and to ensure data transfer in conformance with the required Flow-Spec.

Next, evaluation of the RtMP capability and comparison with existing protocols are performed to examine the validity of RtMP.

Capability evaluation is performed first. Capability evaluation for each primitive of RtMP is performed on a PC-At compatible computer (CPU: Pentium (Intel Corporation) 90 MHz) connected on a dedicated Ethernet.

Figure 9:
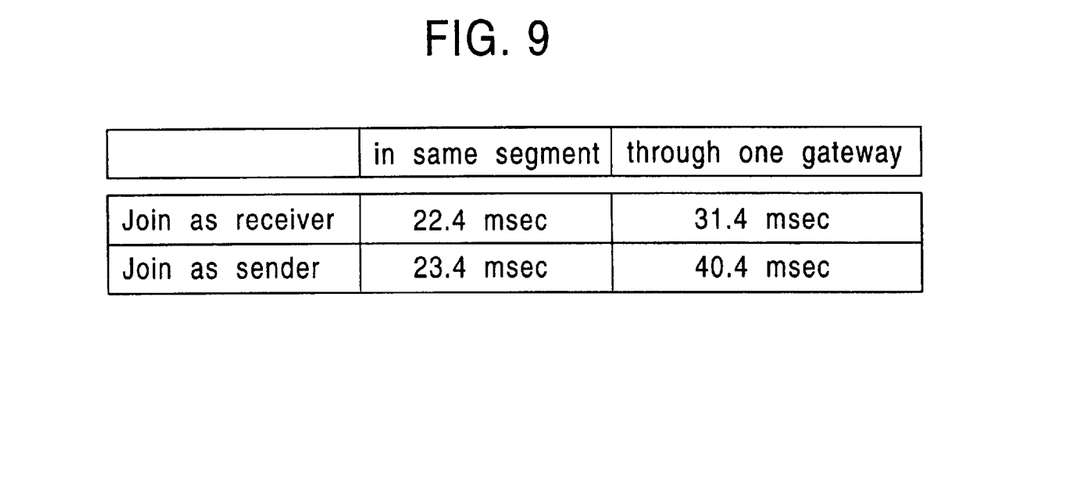
FIG. 9 shows times required for a receiver or sender to join.

FIG. 9 shows times required for a receiver or sender to join in a case in which other members are present in the same segment and in a case in which other members are present in the neighboring segments. The upper portion indicates the measured results when a receiver joins a group where only senders are present, and the lower portion indicates the measured results when a receiver joins a group where a new sender joins a group where one sender and one receiver are present (the sender and the receiver are present in the same segment).

The results show that the connection establishment time is affected by the connection node and the distance to the sender, and also that even when the number of receivers is increased, there is no increase in the connection establishment time and on the contrary, as the distance to the existing connection is decreased, the establishment time is decreased.

Next, a description will be given of the results in which a round-trip time of a message transmission is measured for a given message size, which reflects the protocol overhead (construction and analysis of the packet header, retrieval of connection information, time required for data transfer in accordance with the connection, and so on) of RtMP and which most affects the performance of the application.

Figure 10:
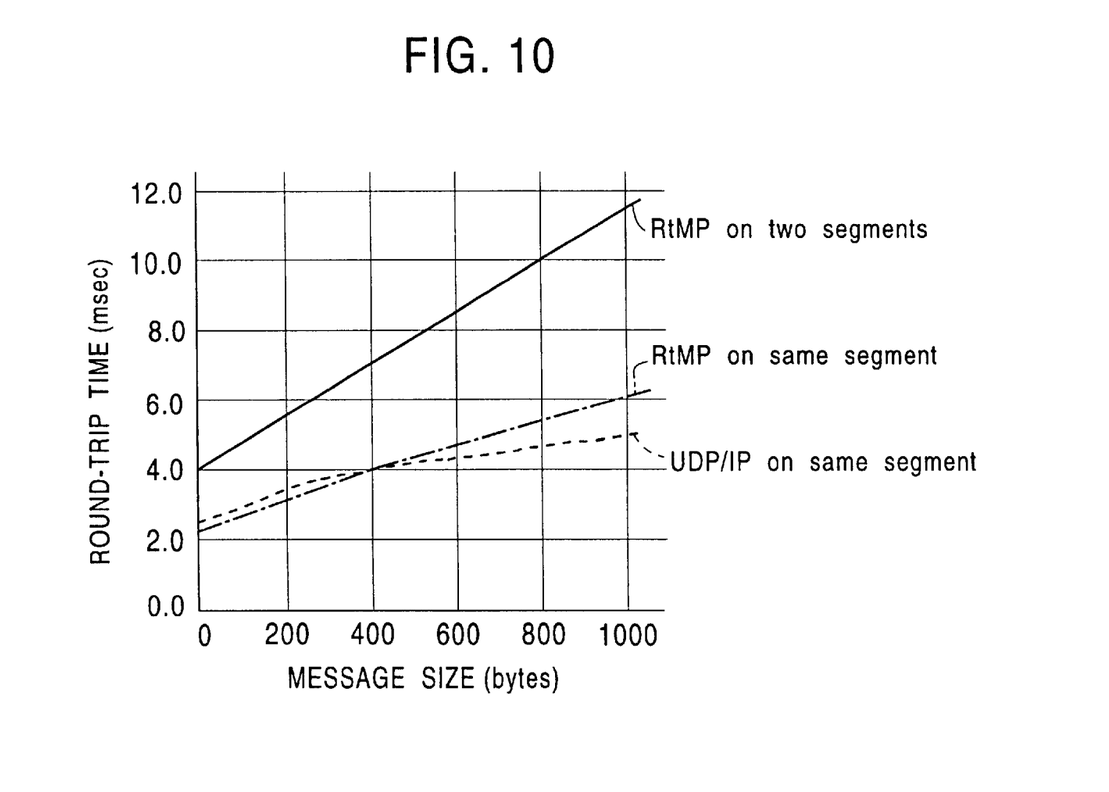
FIG. 10 is a graph illustrating the relationship between round-trip time and message size.

FIG. 10 is a graph illustrating the measured results. The vertical axis indicates the round-trip time (unit: msec), and the horizontal axis indicates the message size (unit: bytes). The graph indicated by the dotted line indicates a round trip time for UDP/IP (User Datagram Protocol/Internet Protocol) in a case in which the other members are present in the same segment. The one-dot chain line indicates a round trip time for RtMP similarly in a case in which the other members are present in the same segment. Further, the graph indicated by the solid line indicates a round trip time for RtMP in a case in which the other members are present in the neighboring segments.

As can be seen in the above-described graphs, the protocol overhead of RtMP is of nearly the same degree as that of a simple UDP, and satisfactory performance is exhibited.

Next, for a mechanism required for a real-time multicast protocol, a comparison between RtMP and other protocols (ST-II, RSVP (Resource ReSerVation Protocol)) is made, and in particular, the validity of a route selection mechanism from the receiver, which is a feature of RtMP, and ensurance of an existing connection are examined.

First, a description will be given on flexibility of connection establishment. Initially, adaptability for a specified request from senders and receivers will be considered. FlowSpec of each connection is determined on the basis of a request from each receiver and the quantity of available resources. The transferring capability of data sent from the sender is determined on the basis of the specified priority level, and the data is sent to only the connection through which the data can be transferred.

Therefore, it is possible for a host with a high level of requests from the receiver and with many resources available on the route to receive data having a high QOS (Quality of Service), and for a host with a low level of requests from the receiver or with small resources available on the route to receive data having a low QOS. Thus, it is possible to cope with various types of requests from the receiver and characteristics of each route.

Next, a description will be given of the effect of the integration of a route control section and the resource reservation protocol, which is the greatest feature of RtMP. In RtMP, only parameters concerning the resource reservation of a route are managed by RtMP, and selection of a route is made according to a request from the receiver, making it possible to construct a tree adapted to requests from the senders and the receivers without being dependent upon a route control algorithm. In Step-II and RSVP, since the resource reservation mechanism is designed independently of route control, route control in response to a request from the receiver is difficult.

Furthermore, in a case in which a route proposed by the route control section cannot satisfy the request because it is in contention with another connection, another route is selected so as to attempt to reestablish a connection. This further improves the possibility of connection establishment.

From these points, it may be said that RtMP provides a connection establishment mechanism having higher flexibility which is more responsive to requests from the sender and the receiver than an existing real-time multicast protocol.

Next, ensurance of an existing connection will be described. The greatest object of a real-time communication protocol using a resource reservation method is to satisfy the real-time characteristic. For this purpose, a connection is established beforehand, and necessary resources are reserved. Therefore, it must be ensured that the connection which is established once always satisfies the request at the time of connection establishment except when a failure occurs in the host or the network.

For one-to-multiple communication, in ST-II and RtMP, it is confirmed that establishment of a new connection does not disturb a existing connection at the time of connection establishment. Thereafter, since the connection is not changed, data communication on the existing connection is ensured to always satisfy the request.

In multiple-to-multiple communication, one important characteristic is the sharing of a connection by a plurality of senders in which the properties of the group are taken into consideration. RSVP and RtMP provide a mechanism therefor. Here, when a plurality of senders attempt to use one connection at the same time, overflow of transfer data occurs, and it becomes impossible for both RSVP and RtMP to ensure data transfer.

In RtMP, properties, such as sharing of a connection, are determined by the sender, and the sender list makes cooperation possible between the senders; therefore, occurrence of overflow of transfer data can be prevented. In comparison, in RSVP, sharing of a connection is determined by the receivers and is not ensured by the senders. Therefore, also in multiple-to-multiple communication, it may be said that RtMP ensures the established connection more than RSVP.

Next, fault tolerance of the protocol will be described. RtMP and ST-II detect failures and perform countermeasures by monitoring neighboring nodes. In RSVP, a failure is monitored by an independent route control algorithm rather than by the protocol itself. When a failure is detected, the route is changed by the routing algorithm so as to change the tree construction automatically. From this respect, it may be said that RSVP is very flexible with respect to flexibility regarding failures.

However, when real-time communication is taken into consideration, the stoppage of data transfer due to an occurrence of a failure is fatal. Therefore, rather than the route is automatically switched by another mechanism, notification to the user and an appropriate process must be performed in accordance with a real-time communication protocol. In cases in which such a process is performed, it may be said that ST-II and RtMP are more suitable than RSVP.

In the foregoing, the integration of a multicast route control mechanism and a connection establishment mechanism, which have hitherto been separate, and a real-time multicast protocol RtMP based on the above-described integration are described. As described above, RtMP is capable of handling various kinds of controls from receivers by reflecting the requests from receivers upon route control. Further, RtMP is capable of providing high-efficiency multiple-to-multiple communication which ensures service level using a sender list management mechanism.

Although the above-described embodiment describes a case in which RtMP is implemented on an RT-Mach, the present invention is not limited to this case.

Further, the present invention can be applied to a new network architecture, such as ATM (Asynchronous Transfer Mode).

According to the communication control method in accordance with the first aspect of the present invention, a route between a sender and a receiver is selected on the basis of a request from the receiver. An interface between a route selection mechanism for establishing a connection and a resource reservation mechanism for reserving resources of the route is defined, and the route selection mechanism and the resource reservation mechanism are integrated. Thus, in one-to-multiple communication, it is possible to select a route appropriate for a request from the request and establish a connection, and it becomes possible to ensure the quality of an established connection.

According to the communication control method in accordance with the second aspect of the present invention, a connection is established from a receiver to each sender on the basis of a list of senders held by each sender. In a case where a plurality of senders share the connection, the number of senders who transmit data at the same time via the connection is limited to below a predetermined number on the basis of the quantity of the resources reserved for the connection. A request to join the network from a new sender or receiver is accepted when a QOS request of the sender and the receiver between which there has been an established connection is ensured even when the new sender or receiver joins the network. Thus, it becomes possible to realize multiple-to-multiple communication and ensure that the quality of the established connection is not disturbed.

According to the communication control method in accordance with the third aspect of the present invention, a connection establishment request is made from a new receiver to a first upper node. On the basis of the request, resources are temporarily reserved. A route suitable for the connection establishment request from the receiver is selected. Establishment of a connection between the first upper node and a second node higher than the first upper node is confirmed. When it is confirmed that the request from the receiver is satisfied, resources are reserved. When the resources are reserved, a connection to a lower node is established from the second node.

According to the communication control method in accordance with the fourth aspect of the present invention, a check is made to determine if a failure of connection with neighboring nodes has occurred. When a failure has occurred, a check is made to determine if a connection has been established with the node with which communication becomes impossible. If a connection has been established, the connection is abandoned. When it is determined that communication with an upper node is impossible, another route is searched for. When there is no other route, the resources of the upper node are freed, and a connection reestablishment request is sent to a lower node. The node which made the connection reestablishment request abandons the current connection, and then searches for another route and attempts to reestablish a connection.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. A communication control method for establishing a connection between a plurality of senders and a plurality of receivers over a plurality of nodes comprising a network and controlling communications between said senders and said receivers, said method comprising the steps of:
   selecting a route between said senders and said receivers based on a request from said receivers;
   defining, in each of said plurality of nodes, a plurality of interfaces between a route selection mechanism for establishing a connection and a resource reservation mechanism for reserving the resources of said route; and
   integrating, in each of said plurality of nodes, said route selection mechanism and said resource reservation mechanism;
   wherein in a case where said route selection mechanism selects said route, when evaluation of said resources of said route must be made, said resource reservation mechanism evaluates the resources of said route, and said route selection mechanism selects said route based on said evaluation results.

2. A communication control method for establishing a connection between a plurality of senders and a plurality of receivers over a network and controlling data transfer from said plurality of senders to said plurality of receivers, said method comprising the steps of:
   establishing a connection from a receiver of said plurality of receivers to each of said plurality of senders by exchanging at least one token according to a sender list held by each of said plurality of senders;
   when said plurality of senders share said connection, limiting a number of said plurality of senders who transmit data via said connection at a same time, by limiting exchanges of said at least one token, to below a predetermined number based on a quantity of resources reserved for said connection; and
   accepting a request for joining said network from a new sender or a new receiver when a QOS (Quality of Service) request from said plurality of senders and said plurality of receivers between which there has been an established connection is ensured even when said new sender or said new receiver joins said network.

3. A communication control method according to claim 2, wherein said receiver receives said data from predetermined data of said plurality of senders.

4. A communication control apparatus for establishing a connection between a plurality of senders and a plurality of receivers over a plurality of nodes comprising a network and controlling communications between said senders and said receivers, comprising:
   means for selecting a route between said senders and said receivers based on a request from said receivers;
   means for defining, in each of said plurality of nodes, a plurality of interfaces between a route selection mechanism for establishing a connection and a resource reservation mechanism for reserving the resources of said route; and
   means for integrating, in each of said plurality of nodes, said route selection mechanism and said resource reservation mechanism;
   wherein in a case where said route selection mechanism selects said route, when evaluation of said resources of said route must be made, said resource reservation mechanism evaluates the resources of said route, and said route selection mechanism selects said route based on said evaluation results.

5. A communication control apparatus for establishing a connection between a plurality of senders and a plurality of receivers over a network and controlling data transfer from said plurality of senders to said plurality of receivers, comprising:
   means for establishing a connection from a receiver of said plurality of receivers to each of said plurality of senders by exchanging at least one token according to a sender list held by each of said plurality of senders;
   means for, when said plurality of senders share said connection, limiting a number of said plurality of senders who transmit data via said connection at a same time, by limiting exchanges of said at least one token, to below a predetermined number based on a quantity of resources reserved for said connection; and
   means for accepting a request for joining said network from a new sender or a new receiver when a QOS (Quality of Service) request from said plurality of senders and said plurality of receivers which there has been an established connection is ensured even when said new sender or said new receiver joins said network.

6. A communication control apparatus according to claim 5, wherein said receiver receives said data from predetermined data of said plurality of senders.

* * * * *